(12) United States Patent  (10) Patent No.: US 8,922,702 B2
Tanabe  (45) Date of Patent: Dec. 30, 2014

(54) IMAGING DEVICE AND ELECTRONIC APPARATUS

(71) Applicant: Kabushiki Kaisha Toshiba, Tokyo (JP)

(72) Inventor: Ken Tanabe, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 149 days.

(21) Appl. No.: 13/752,999

(22) Filed: Jan. 29, 2013

(65) Prior Publication Data

US 2014/0063326 A1 Mar. 6, 2014

(30) Foreign Application Priority Data

Aug. 31, 2012 (JP) ................................ 2012-192372

(51) Int. Cl.
  H04N 5/232 (2006.01)
  H04N 5/225 (2006.01)
  G02B 27/00 (2006.01)

(52) U.S. Cl.
  CPC ................................. *H04N 5/2254* (2013.01)
  USPC ............ 348/345; 348/374; 348/376; 359/824

(58) Field of Classification Search
  CPC ... H04N 5/23212; H04N 5/2253; G03B 13/36
  USPC .............. 348/345, 374, 376; 396/93; 359/824
  See application file for complete search history.

(56) References Cited

U.S. PATENT DOCUMENTS

| 4,570,185 A | * | 2/1986 | Arai et al. | 348/345 |
| 8,369,698 B2 | * | 2/2013 | Okamura | 396/55 |
| 2006/0197865 A1 | * | 9/2006 | Birecki et al. | 348/345 |
| 2007/0216799 A1 | | 9/2007 | Honma | |
| 2008/0285163 A1 | | 11/2008 | Kasuga et al. | |
| 2011/0299181 A1 | * | 12/2011 | Pang et al. | 359/824 |
| 2012/0027391 A1 | * | 2/2012 | Okamura | 396/55 |

FOREIGN PATENT DOCUMENTS

| JP | 04-137871 A | | 5/1992 | |
| JP | 05-048957 A | | 2/1993 | |
| JP | 2006-050693 A | | 2/2006 | |
| JP | 2006153970 A | * | 6/2006 | ............ H04N 5/225 |
| JP | 2007-174222 A | | 7/2007 | |
| JP | 2007-248844 A | | 9/2007 | |
| JP | 2008-287034 A | | 11/2008 | |
| JP | 2011-253134 A | | 12/2011 | |

* cited by examiner

*Primary Examiner* — Nhan T Tran
(74) *Attorney, Agent, or Firm* — Knobbe, Martens, Olson & Bear LLP

(57) ABSTRACT

An imaging device according to embodiments includes a lens support that fixes a set of optical lenses, a substrate that fixes the lens support, an imaging element arranged between the set of optical lenses and the substrate, and an elastic body connected to the imaging element and a member other than the imaging element. The substrate includes a Lorentz-force generating unit that generates a Lorentz force between the Lorentz-force generating unit and the imaging element. Furthermore, the substrate moves the imaging element to a position at which the imaging element has a desired optical property by adjusting the Lorentz force.

20 Claims, 7 Drawing Sheets

IMAGING DEVICE AND ELECTRONIC APPARATUS

CROSS-REFERENCE TO RELATED APPLICATIONS

This application is based upon and claims the benefit of priority from Japanese Patent Application No. 2012-192372, filed on Aug. 31, 2012; the entire contents of which are incorporated herein by reference.

FIELD

Embodiments described herein relate generally to an imaging device and an electronic apparatus.

BACKGROUND

Recently, in order to improve the image quality of a camera (imaging device) built in a portable electronic apparatus, the number of pixels in an imaging element mounted on the camera is increasing. An imaging device built in a portable electronic apparatus in some cases has an autofocus function to improve the quality of captured images. Autofocusing is performed by an electric actuator moving an optical system in an imaging device in an optical axis direction by electricity.

Conventional electric actuator mechanisms are, for example, such that a magnet is arranged around a holder that holds a plurality of lenses and a support that holds the holder includes a coil. Moreover, the holder is connected by a spring. The balance between the Lorentz force acting between the coil and the magnet and the elastic force of the spring is adjusted by causing current to flow in the coil. Consequently, the position of the holder in the optical axis direction is controlled, thereby realizing an electric actuator.

In an imaging device, the pixel spacing is reduced with an increase in pixel density of an imaging element, therefore, the resolution required of a lens is increasing. Thus, the number of lenses is increased to four or more from three in conventional imaging devices. If the number of lenses increases, the weight of the holder including the lenses increases, therefore, the coil and the magnet for an electric actuator increase in size and thickness, which results in increasing power consumption.

However, in order to reduce the size and the thickness of a portable electronic apparatus, a demand for reducing the size and the thickness of an imaging device is growing. Therefore, it is desirable to reduce the size and the thickness of an electric actuator for autofocusing.

DETAILED DESCRIPTION

According to embodiments, an imaging device is provided. The imaging device includes a lens support that fixes a set of optical lenses, a substrate that fixes the lens support, an imaging element (image pickup device) that is arranged to face the substrate between the set of optical lenses and the substrate, and an elastic body whose one end portion is connected to the imaging element and whose another end portion is connected to a member other than the imaging element. The substrate includes a first Lorentz-force generating unit that generates a Lorentz force between the first Lorentz-force generating unit and the imaging element, and the imaging element includes a second Lorentz-force generating unit that generates the Lorentz force between the second Lorentz-force generating unit and the substrate. Furthermore, when an optical property of the imaging element with respect to the lens is changed to a desired property, the substrate moves a position of the imaging element with respect to the set of optical lenses to a position according to the desired property and adjusts the Lorentz force to balance the Lorentz force with an elastic force of the elastic body at the position.

An imaging device and an electronic apparatus according to the embodiments will be explained below in detail with reference to the drawings. The present invention is not limited to these embodiments.

First, definition of terms used in the embodiments will be explained. "Optical axis direction" in the embodiments means a direction (direction parallel to a line connecting an optical member and an object) parallel to a central axis of light incident on a set of optical lenses from an object. Moreover, in the embodiments, when the structure of each component is explained, the surface and the portion close to an object are, for example, described as a surface and a portion on the "object side", and the surface and the portion positioned opposite to the object side are, for example, described as a surface and a portion on the "image plane side".

First Embodiment

Figure 1A:
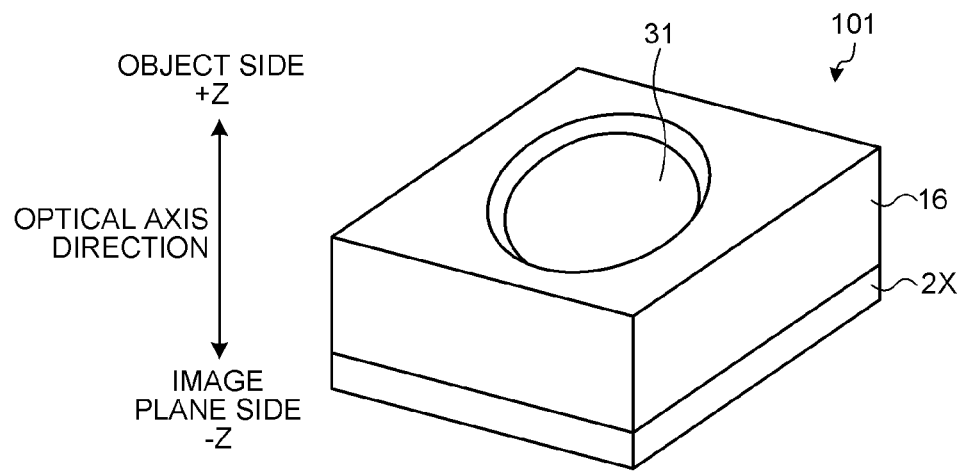
FIG. 1A is a diagram illustrating an appearance configuration of an imaging device according to a first embodiment.

FIG. 1A is a diagram illustrating an appearance configuration of an imaging device according to the first embodiment. FIG. 1A is a perspective view (stereodiagram) illustrating an appearance configuration of an imaging device 101. In the imaging device 101, a support 16, which covers the imaging device 101 and holds a lens 31, and a PCB (Printed Circuit Board) substrate 2X are arranged in order from the object side, which is the +Z side, toward the image plane side, which is the −Z side, in the optical axis direction.

The support 16 in the present embodiment holds the lens (optical lens) 31 and other lenses (lenses 32 to 34 to be described later) and is fixed to the PCB substrate 2X. In the PCB substrate 2X, coils for moving an imaging element to be described later and the like are arranged.

Figure 1B:
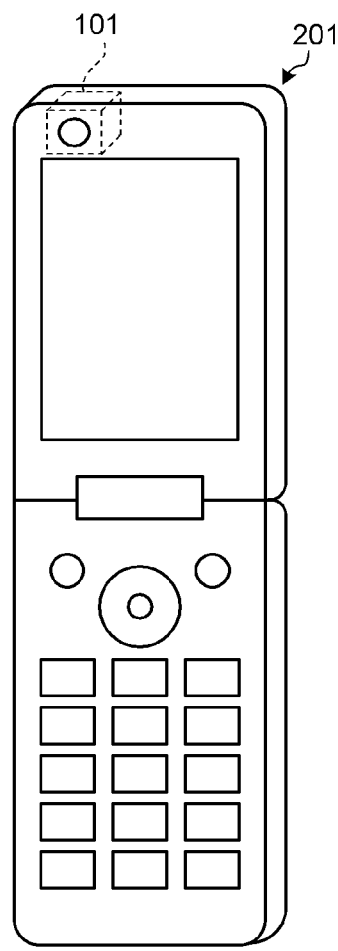
FIG. 1B is a diagram illustrating an appearance configuration of an electronic apparatus including the imaging device according to the first embodiment.

FIG. 1B is a diagram illustrating an appearance configuration of an electronic apparatus including the imaging device according to the first embodiment. FIG. 1B is a perspective view (stereodiagram) illustrating an appearance configuration of a mobile phone 201, which is one example of an electronic apparatus. As shown in FIG. 1B, the mobile phone 201 includes the imaging device 101. The electronic apparatus is not limited to the mobile phone 201 and may be other apparatus, such as a PDA (Personal Digital Assistant) and a PHS.

Figure 2:
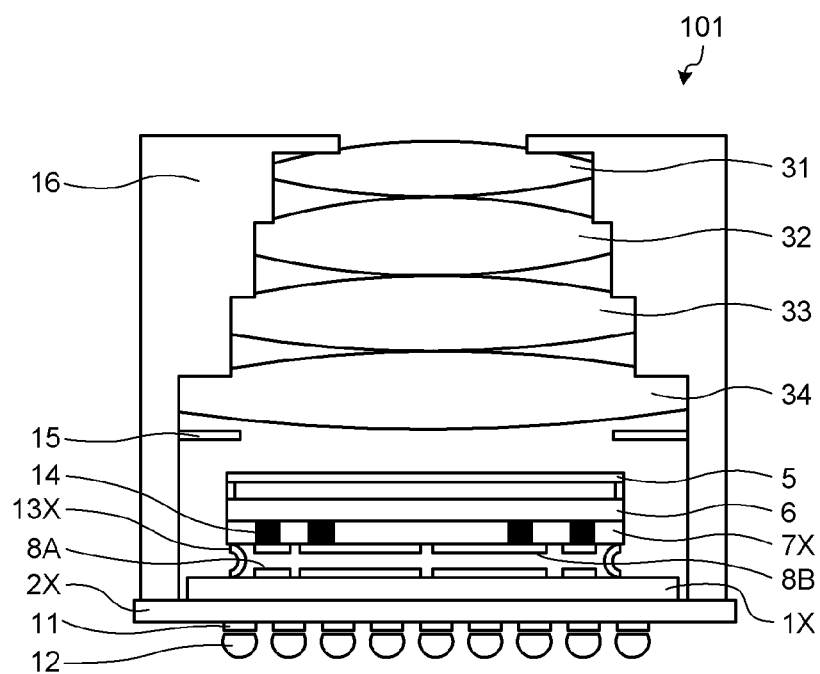
FIG. 2 is a diagram illustrating a cross-sectional configuration of the imaging device according to the first embodiment.

FIG. 2 is a diagram illustrating a cross-sectional configuration of the imaging device according to the first embodiment. FIG. 2 illustrates a cross-sectional view of the imaging device 101 cut along a plane parallel to the optical axis direction. The imaging device 101 includes the lenses 31 to 34, the support 16, the imaging element, the PCB substrate 2X, a plate spring 13X, and a stopper 15.

The imaging element is an element that detects light from an object incident through the lenses 31 to 34 and generates image data. The imaging element includes an infrared cut filter 5, a photodetector layer 6, a substrate layer 7X, and a coil group 8B.

The imaging element is a backside-illuminated imaging element. The imaging element is arranged on the image side of the lenses 31 to 34 and on the object side of the PCB substrate 2X. In other words, the imaging element is arranged between the lenses 31 to 34 and the PCB substrate 2X.

The imaging element is formed by attaching the photodetector layer 6 and the substrate layer 7X manufactured separately from the photodetector layer 6 to each other. The imaging element is arranged such that the photodetector layer 6 is on the object side and the substrate layer 7X is on the image plane side. Moreover, the substrate layer 7X is provided with through silicon vias (TSVs) 14, and circuits, such as a data transmission modulation circuit 18B to be described later, and the photodetector layer 6 are connected via the through silicon vias 14.

Moreover, the infrared cut filter 5 is fixed to the object side (object side of the photodetector layer 6) in the imaging element. Moreover, the coil group 8B is formed on the image plane side in the imaging element. In other words, in the imaging element, the infrared cut filter 5, the photodetector layer 6, the substrate layer 7X, and the coil group 8B are arranged in order from the object side toward the image plane side.

The PCB substrate 2X is a substrate that controls the imaging element. The PCB substrate 2X controls the position of the imaging element and causes the imaging element to generate image data. The PCB substrate 2X includes a coil group 8A, a substrate chip 1X, solder pads 11, and solder balls 12.

In the PCB substrate 2X, the coil group 8A is formed on the surface of the substrate chip 1X on the object side. In this manner, the surface of the coil group 8A on the image plane side is fixed to the PCB substrate 2X. The PCB substrate 2X includes the solder pads 11 and the solder balls 12 on the surface on the image plane side and is fixed to a substrate or the like of the electronic apparatus by soldering. The peripheral portion of the PCB substrate 2X on the object side is fixed by the bottom portion of the support 16.

The lens 31, the lens 32, the lens 33, the lens 34, and the stopper 15 are fixed to the support 16 in order from the object side toward the image plane side. The stopper 15 prevents the imaging element from coming into contact with the lens 34.

The plate spring 13X connects the substrate layer 7X of the imaging element to the substrate chip 1X of the PCB substrate 2X. The diagonal length of the imaging element is, for example, 4.86 mm, and the distance between the center of the optical axis of the object surface of the lens 31 and the center of the optical axis of the image plane side of the lens 34 is, for example, 3.601 mm. Moreover, the distance from the center of the optical axis of the image plane side of the lens 34 to the surface of the infrared cut filter 5 is, for example, 0.634 mm in the case of imaging at infinity and is, for example, 0.771 mm in the case of short range imaging of 100 mm.

In the present embodiment, when an image is captured by using the autofocus function, the support 16, the lenses 31 to 34, and the PCB substrate 2X are not moved and the imaging element is moved with respect to the PCB substrate 2X. At this time, the balance between the Lorentz force and the elastic force of the plate spring 13X is adjusted between the imaging element and the PCB substrate 2X, whereby the distance between the imaging element and the PCB substrate 2X is controlled.

For example, the imaging element is lifted from the PCB substrate 2X by the plate spring 13X and the imaging element is pulled toward the PCB substrate 2X side by the Lorentz force, whereby the position of the imaging element with respect to the PCB substrate 2X (the lenses 31 to 34) is controlled.

The position of the imaging element with respect to the PCB substrate 2X (the lenses 31 to 34) may be controlled by pulling the imaging element toward the PCB substrate 2X side by the plate spring 13X and lifting the imaging element from the PCB substrate 2X by the Lorentz force.

When the imaging device 101 captures an image of an object, the position of the imaging element with respect to the lenses 31 to 34 is moved as necessary. The position (height) of the imaging element is moved, therefore, the optical property (such as focusing) of the imaging element with respect to the lenses 31 to 34 changes to the property corresponding to the position of the imaging element. Specifically, when the optical property of the imaging element with respect to the lenses 31 to 34 is changed to a desired property, the Lorentz force is adjusted such that the position of the imaging element is moved to the position according to the desired optical property and the Lorentz force and the elastic force of the plate spring 13X are balanced at the position. The position of the imaging element is controlled by adjusting the Lorentz force by the PCB substrate 2X. In the present embodiment, an image is focused on the imaging element by moving the imaging element parallel to the optical axis between the lens 34 and the PCB substrate 2X.

When the light from an object enters the lenses 31 to 34 from the object side of the imaging device 101, the incident light is focused by the lenses 31 to 34. Then, when the focused light reaches the photodetector layer 6 of the imaging element, the light focused in the photodetector layer 6 is converted into an electrical signal in the substrate layer 7X. This electrical signal corresponds to the image data on the object. The electrical signal is sent from the substrate layer 7X to the PCB substrate 2X.

Figure 3:
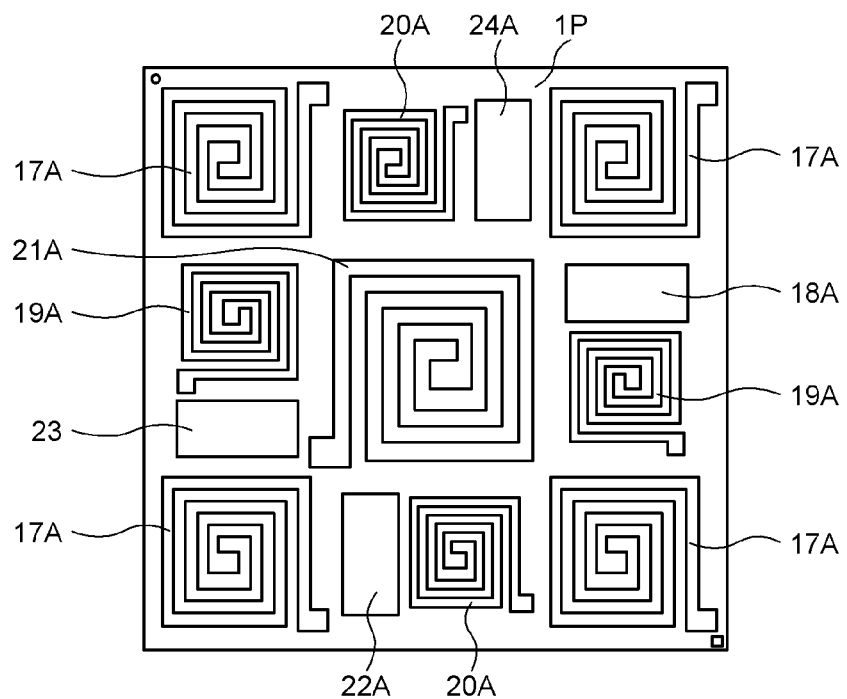
FIG. 3 is a top view of a substrate chip according to the first embodiment included in a PCB substrate.
Figure 4:
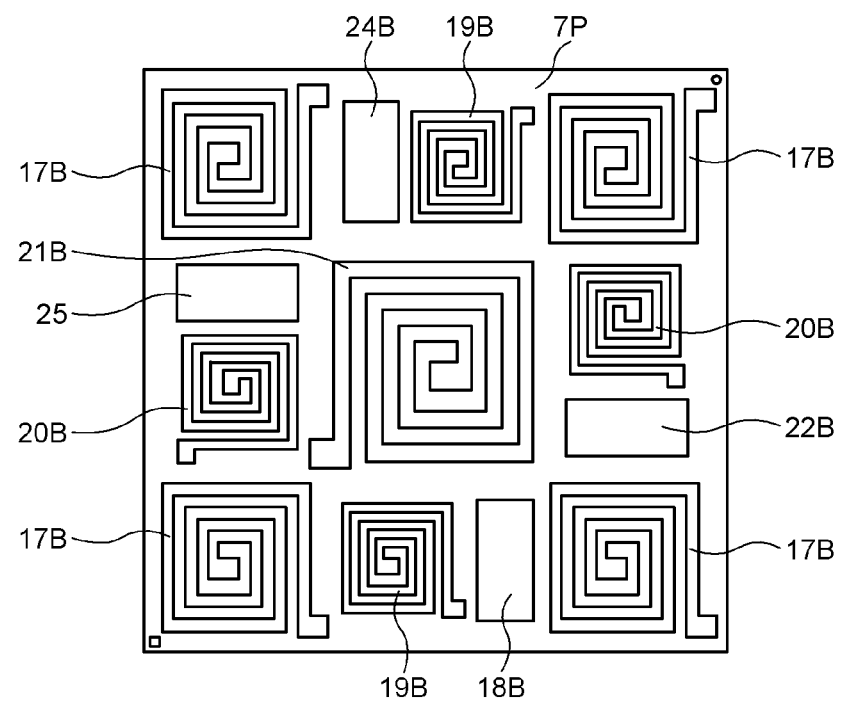
FIG. 4 is a top view of a substrate layer according to the first embodiment included in an imaging element.

FIG. 3 is a top view of a substrate chip according to the first embodiment included in the PCB substrate and FIG. 4 is a top view of a substrate layer according to the first embodiment included in the imaging element. FIG. 3 illustrates a top surface of a substrate chip 1P, which is an example of the substrate chip 1X, as a diagram when the PCB substrate 2X is viewed from the object side. Moreover, FIG. 4 illustrates a bottom surface of a substrate layer 7P, which is an example of the substrate layer 7X, as a diagram when the imaging element is viewed from the image plane side. In other words, FIG. 4 illustrates the imaging element when the imaging device 101 is viewed from the image plane side and FIG. 3 illustrates the substrate chip 1P when the imaging device 101 is viewed from the object side. In the imaging device 101, the substrate chip 1P in FIG. 3 and the substrate layer 7P in FIG. 4 are arranged to face each other.

As shown in FIG. 3, data transmission coils 19A, data reception coils 20A, a power coil 21A, actuator coils 17A, a data transmission modulation circuit 18A, a data reception demodulation circuit 22A, a power modulation circuit 23, and an actuator coil drive circuit 24A are formed on the main surface of the substrate chip 1P on the object side.

The data transmission coils 19A, the data reception coils 20A, the power coil 21A, and the actuator coils 17A on the substrate chip 1P correspond to the coil group 8A. The coil group 8A is formed on the substrate chip 1P, for example, by a semiconductor process.

The power coil 21A is, for example, arranged in the central portion of the substrate chip 1P and the coils and circuits other than the power coil 21A are arranged near the periphery of the substrate chip 1P. For example, the power coil 21A is arranged such that the center of the substrate chip 1P is at the same position as the center of the power coil 21A.

Moreover, in the substrate chip 1P, two data transmission coils 19A are arranged to sandwich the power coil 21A in the top surface of the substrate chip 1P. Specifically, the two data transmission coils 19A are arranged to exhibit point symmetry with respect to the center of the substrate chip 1P being a symmetric point. The two data transmission coils 19A may be wound in opposite directions to each other or may be wound in the same direction.

Moreover, in the substrate chip 1P, two data reception coils 20A are arranged to sandwich the power coil 21A in the top surface of the substrate chip 1P. Specifically, the two data reception coils 20A are arranged to exhibit point symmetry with respect to the center of the substrate chip 1P being a symmetric point. The two data reception coils 20A may be wound in opposite directions to each other or may be wound in the same direction.

Moreover, in the substrate chip 1P, four actuator coils 17A are arranged to exhibit 90-degree rotational symmetry with respect to the center of the substrate chip 1P being a symmetric point. For example, the four actuator coils 17A are arranged at four corners of the substrate chip 1P. The four actuator coils 17A may be all wound in the same direction or at least one of them may be wound in an opposite direction.

Moreover, the data transmission modulation circuit 18A is, for example, arranged near the data transmission coil 19A. Moreover, the data reception demodulation circuit 22A is, for example, arranged near the data reception coil 20A.

Moreover, the power modulation circuit 23 is, for example, arranged near the power coil 21A. Moreover, the actuator coil drive circuit 24A is, for example, arranged near the actuator coil 17A.

As shown in FIG. 4, data transmission coils 19B, data reception coils 20B, a power coil 21B, actuator coils 17B, the data transmission modulation circuit 18B, a data reception demodulation circuit 22B, a power demodulation circuit 25, and an actuator coil drive circuit 24B are formed on the main surface of the substrate layer 7P on the image plane side.

The data transmission coils 19B, the data reception coils 20B, the power coil 21B, and the actuator coils 17B on the substrate layer 7P correspond to the coil group 8B. The coil group 8B is formed on the substrate layer 7P, for example, by a semiconductor process.

The power coil 21B is, for example, arranged in the central portion of the substrate layer 7P and the coils and circuits other than the power coil 21B are arranged near the periphery of the substrate layer 7P. For example, the power coil 21B is arranged such that the center of the substrate layer 7P is at the same position as the center of the power coil 21B.

Moreover, in the substrate layer 7P, two data transmission coils 19B are arranged to sandwich the power coil 21B in the bottom surface of the substrate layer 7P. Specifically, the two data transmission coils 19B are arranged to exhibit point symmetry with respect to the center of the substrate layer 7P being a symmetric point. The two data transmission coils 19B may be wound in opposite directions to each other or may be wound in the same direction.

Moreover, in the substrate layer 7P, two data reception coils 20B are arranged to sandwich the power coil 21B in the bottom surface of the substrate layer 7P. Specifically, the two data reception coils 20B are arranged to exhibit point symmetry with respect to the center of the substrate layer 7P being a symmetric point. The two data reception coils 20B may be wound in opposite directions to each other or may be wound in the same direction. Moreover, in the substrate layer 7P, four actuator coils 17B are arranged at four corners of the substrate layer 7P.

Moreover, the data transmission modulation circuit 18B is, for example, arranged near the data transmission coil 19B. Moreover, the data reception demodulation circuit 22B is, for example, arranged near the data reception coil 20B.

Moreover, the power demodulation circuit 25 is, for example, arranged near the power coil 21B. Moreover, the actuator coil drive circuit 24B is, for example, arranged near the actuator coil 17B.

An example of the positional relationship between the coil group 8A arranged in the substrate chip 1P and the coil group 8B arranged in the substrate layer 7P will be explained. The data transmission coils 19A and the data reception coils 20B are arranged to face each other. Moreover, the data reception coils 20A and the data transmission coils 19B are arranged to face each other. Moreover, the actuator coils 17A and the actuator coils 17B are arranged to face each other.

The arrangement and the number of the coils and the circuits arranged on the substrate chip 1P are not limited to those shown in FIG. 3 and any number of the coils and the circuits may be arranged at any position. Moreover, the arrangement and the number of the coils and the circuits arranged on the substrate layer 7P are not limited to those shown in FIG. 4 and any number of the coils and the circuits may be arranged at any position.

The data transmission coil 19A is a coil that transmits data to the data reception coil 20B of the substrate layer 7P arranged to face the data transmission coil 19A by electromagnetic induction. The data reception coil 20A is a coil that receives data from the data transmission coil 19B of the substrate layer 7P by electromagnetic induction.

The power coil 21A is a coil that performs power transfer between the power coil 21A and the power coil 21B by electromagnetic induction. The actuator coil 17A is a coil that generates the Lorentz force between the actuator coil 17A and the actuator coil 17B arranged to face the actuator coil 17A by causing current to flow.

The data transmission modulation circuit 18A superimposes a clock on data to be transmitted to the substrate layer 7P side and modulates the data to a radio frequency to generate a signal and causes the signal to flow to the data transmission coils 19A. The data to be transmitted to the substrate layer 7P side, for example, includes information for controlling the substrate layer 7P and the like. The data reception demodulation circuit 22A decomposes a signal sent from the substrate layer 7P side into data and a clock by demodulating the signal received by the data reception coils 20A. The signal sent from the substrate layer 7P side is, for example, image data or the like.

The power modulation circuit 23 is a circuit that modulates power from direct current to alternating current and causes the power to flow into the power coil 21A. Moreover, the power modulation circuit 23 performs control for compensating for the power transfer efficiency changed by the change of the distance between the substrate chip 1P and the substrate layer 7P. The actuator coil drive circuit 24A is a circuit that adjusts current that flows in the actuator coils 17A.

The data transmission coil 19B is a coil that transmits data to the data reception coil 20A of the substrate chip 1P arranged to face the data transmission coil 19B by electromagnetic induction. The data reception coil 20B is a coil that receives data from the data transmission coil 19A of the substrate chip 1P by electromagnetic induction.

The power coil 21B is a coil that performs power transfer between the power coil 21B and the power coil 21A by electromagnetic induction. The actuator coil 17B is a coil that generates the Lorentz force between the actuator coil 17B and the actuator coil 17A arranged to face the actuator coil 17B by causing current to flow.

The data transmission modulation circuit 18B superimposes a clock on data to be transmitted to the substrate chip 1P side and modulates the data to a radio frequency to generate a signal and causes the signal to flow to the data transmission coils 19B. The data reception demodulation circuit 22B separates a radio-frequency modulated signal received by the data reception coils 20B into data and a clock by demodulating the signal.

The power demodulation circuit 25 is a circuit that demodulates power received by the power coil 21B from alternating current to direct current. The actuator coil drive circuit 24B is a circuit that adjusts current that flows in the actuator coils 17B.

In the substrate chip 1P, power is modulated from direct current to alternating current by the power modulation circuit 23 and is caused to flow in the power coil 21A. Consequently, power transfer (wireless power feeding) is performed between the power coil 21B arranged to face the power coil 21A and the power coil 21A by electromagnetic induction.

Moreover, when an image is captured by using the autofocus function, the balance between the Lorentz force and the elastic force of the plate spring 13X is adjusted between the imaging element and the PCB substrate 2X, whereby the distance between the imaging element and the PCB substrate 2X is controlled.

Specifically, the current flowing in the actuator coils 17A and the current flowing in the actuator coils 17B are adjusted, whereby the Lorentz force acting between the actuator coils 17A and 17B is adjusted. Consequently, the imaging element is moved to a position according to the difference between the Lorentz force and the elastic force of the plate spring 13X and the Lorentz force and the elastic force are balanced. The position at which the Lorentz force and the elastic force are balanced is controlled in this manner, therefore, the distance between the substrate layer 7P of the imaging element and the lens 34 is adjusted, for example, between 0.634 mm and 0.771 mm. In this manner, the position of the imaging element in the optical axis direction is controlled, whereby an electric actuator is realized.

The number of each type of coil arranged on the substrate chip 1P and the number of each type of coil arranged on the substrate layer 7P may be any number. For example, three or less or five or more actuator coils 17A may be arranged on the substrate chip 1P. Moreover, three or more data transmission coils 19A and three or more data reception coils 20A may be arranged on the substrate chip 1P. Moreover, each coil in the coil groups 8A and 8B may have any shape.

Moreover, in the present embodiment, explanation is given of a case where the image plane side of the imaging element is connected to the substrate chip with the plate spring 13X, however, the object side of the imaging element may be connected to the substrate chip with the plate spring 13X. In this case, the object side of the imaging element is connected to the support 16 or the like with the plate spring 13X. The object side of the imaging element may be connected to a member other than the support 16. Moreover, when the object side of the imaging element is connected to the substrate chip with the plate spring 13X, the stopper 15 is provided on the image plane side of the imaging element. Moreover, a different elastic body (such as rubber) may be used instead of the plate spring 13X. Moreover, a different substrate (such as semiconductor substrate) may be used instead of the PCB substrate 2X.

In the present embodiment, a plurality of the actuator coils 17A and a plurality of the actuator coils 17B are mounted on the surfaces orthogonal to the optical axis, respectively. Each pair of the actuator coils 17A and 17B is individually controlled, whereby tilting of the imaging element can be controlled.

In other words, when the imaging device 101 includes a plurality of pairs of the actuator coils 17A and 17B, a different driving force (Lorentz force) may be applied to each pair of the actuator coils 17A and 17B. The imaging element can be tilted with respect to the lenses 31 to 34 by adjusting the magnitude of the Lorentz force for each pair of the actuator coils 17A and 17B. Consequently, tiling of the image plane due to defect of the lenses 31 to 34 or the support 16 at the time of manufacture can be corrected, therefore, an image can be correctly focused on the imaging element.

Moreover, the position of the imaging element in the optical axis direction may be rapidly shifted by rapidly changing the Lorentz force generated by the actuator coils 17A and 17B after the imaging element is moved to the position at which the elastic force of the plate spring 13X is maximized. Consequently, dust adhered to the surface of the imaging element can be removed.

Moreover, the PCB substrate 2X may control the position of the imaging element in the optical axis direction on the basis of the contrast of a captured image. In this case, the PCB substrate 2X continuously obtains images captured by the imaging device 101 while shifting the position of the imaging element in the optical axis direction. Then, the PCB substrate 2X realizes autofocus by determining the position at which the contrast of a captured image is maximized as a position of the imaging element in the optical axis direction.

Moreover, at least one of the data transmission coils 19A, the data reception coils 20A, the power coil 21A, the actuator coils 17A, the data transmission modulation circuit 18A, the data reception demodulation circuit 22A, the power modulation circuit 23, and the actuator coil drive circuit 24A may be arranged at a position other than the object side of the substrate chip 1P.

Moreover, at least one of the data transmission coils 19B, the data reception coils 20B, the power coil 21B, the actuator coils 17B, the data transmission modulation circuit 18B, the data reception demodulation circuit 22B, the power demodulation circuit 25, and the actuator coil drive circuit 24B may be arranged at a position other than the image plane side of the substrate layer 7P.

In this manner, according to the first embodiment, because the position of the imaging element is moved in a state where the positions of the lenses 31 to 34 are fixed, the positional relationship between the imaging element and the support 16 can be changed with a small device configuration.

Moreover, because the coils that transmit data, power, and the like are arranged to face each other, data, power, and the like can be efficiently transmitted. Moreover, because the imaging element lighter than the lenses 31 to 34 is moved, the autofocus function can be realized at high speed and with low power consumption.

Second Embodiment

Next, the second embodiment of the present invention will be explained with reference to FIG. 5. In the second embodiment, the imaging element is moved by arranging magnets instead of the actuator coils 17A.

The imaging element in the present embodiment has a configuration similar to the imaging element in the first embodiment, therefore, explanation thereof is omitted. Moreover, a power transfer method and a data transmission and reception method in the present embodiment are similar to those in the first embodiment, therefore, explanation thereof is omitted.

Figure 5:
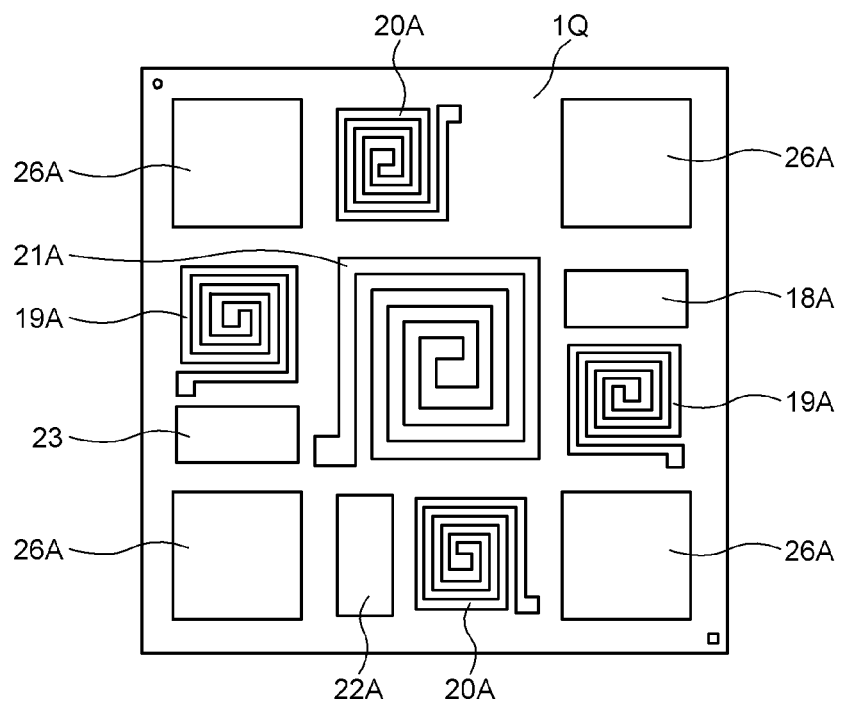
FIG. 5 is a top view of a substrate chip according to a second embodiment included in a PCB substrate.

FIG. 5 is a top view of a substrate chip according to the second embodiment included in the PCB substrate. FIG. 5 illustrates a top surface of a substrate chip 1Q, which is an example of the substrate chip 1X, as a diagram when the PCB substrate 2X is viewed from the object side. Among the components in FIG. 5, components that achieve the same function as those in the substrate chip 1P in FIG. 3 are denoted by the same reference numerals and overlapping explanation is omitted.

As shown in FIG. 5, the data transmission coils 19A, the data reception coils 20A, the power coil 21A, magnets 26A, the data transmission modulation circuit 18A, the data reception demodulation circuit 22A, and the power modulation circuit 23 are formed on the main surface of the substrate chip 1Q on the object side.

The magnets 26A are arranged at substantially the same positions as the actuator coils 17A in FIG. 3. Specifically, four magnets 26A are arranged at four corners of the substrate chip 1Q.

When an image is captured by using the autofocus function, the balance between the Lorentz force and the elastic force of the plate spring 13X is adjusted between the imaging element and the PCB substrate 2X, whereby the distance between the imaging element and the PCB substrate 2X is controlled.

Specifically, current flowing in the actuator coils 17B is adjusted, whereby the Lorentz force acting between the magnets 26A and the actuator coils 17B is adjusted. Consequently, the imaging element is moved to a position according to the difference between the Lorentz force and the elastic force of the plate spring 13X and the Lorentz force and the elastic force are balanced. The position at which the Lorentz force and the elastic force are balanced is controlled in this manner, therefore, the distance between the substrate layer 7P of the imaging element and the lens 34 is adjusted, for example, between 0.634 mm and 0.771 mm. In this manner, the position of the imaging element in the optical axis direction is controlled, whereby a moving-coil type electric actuator is realized.

In the present embodiment, a plurality of the magnets 26A and a plurality of the actuator coils 17B are mounted on the surfaces orthogonal to the optical axis, respectively. Each pair of the magnet 26A and the actuator coil 17B is individually controlled, whereby tilting of the imaging element can be controlled.

The number of each type of coil and the magnet 26A arranged on the substrate chip 1Q may be any number. For example, three or less or five or more magnets 26A may be arranged on the substrate chip 1Q. Moreover, the arrangement and the number of the coils and the circuits arranged on the substrate chip 1Q are not limited to those shown in FIG. 5 and any number of the coils and the circuits may be arranged at any position. Moreover, the magnets 26A and the actuator coils 17A may be mixed on the substrate chip 1Q.

In this manner, according to the second embodiment, because the position of the imaging element is controlled by using the magnets 26A and the actuator coils 17B, the power consumption of the entire module can be suppressed while suppressing an increase in weight of the imaging element.

Third Embodiment

Next, the third embodiment of the present invention will be explained with reference to FIG. 6. In the third embodiment, the imaging element is moved by using the Lorentz force acting between the magnets and the actuator coils 17A by arranging the magnets instead of the actuator coils 17B.

The substrate chip 1P in the present embodiment has a configuration similar to the substrate chip 1P in the first embodiment, therefore, explanation thereof is omitted. Moreover, a power transfer method and a data transmission and reception method in the present embodiment are similar to those in the first embodiment, therefore, explanation thereof is omitted.

Figure 6:
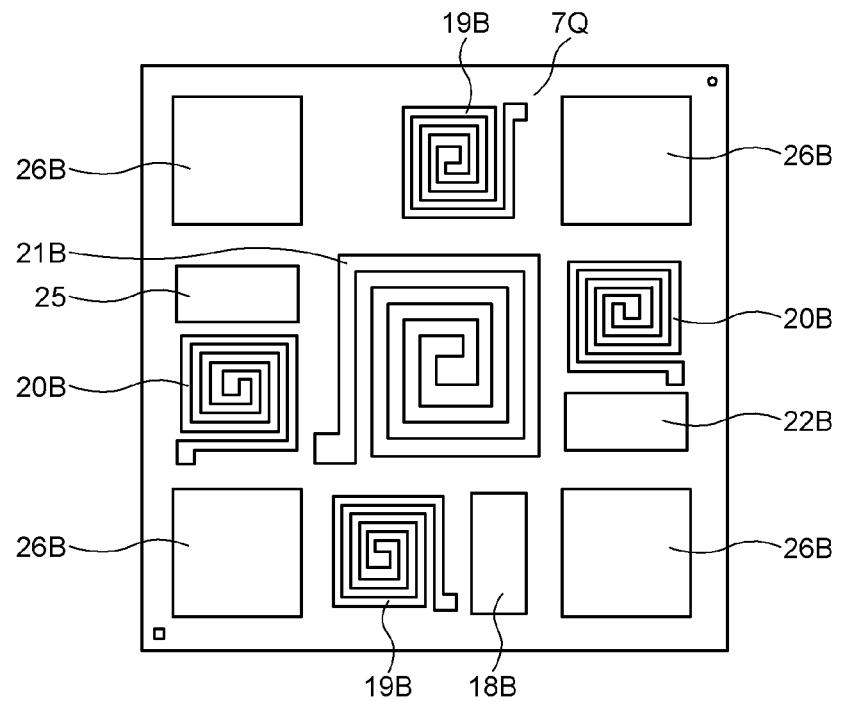
FIG. 6 is a top view of a substrate layer according to a third embodiment included in an imaging element.

FIG. 6 is a top view of a substrate layer according to the third embodiment included in the imaging element. FIG. 6 illustrates a bottom surface of a substrate layer 7Q, which is an example of the substrate layer 7X, as a diagram when the imaging element is viewed from the image plane side. Among the components in FIG. 6, components that achieve the same function as those in the substrate layer 7P in FIG. 4 are denoted by the same reference numerals and overlapping explanation is omitted.

As shown in FIG. 6, the data transmission coils 19B, the data reception coils 20B, the power coil 21B, magnets 26B, the data transmission modulation circuit 18B, the data reception demodulation circuit 22B, and the power demodulation circuit 25 are formed on the main surface of the substrate layer 7Q on the image plane side.

The magnets 26B are arranged at substantially the same positions as the actuator coils 17B in FIG. 4. Specifically, four magnets 26B are arranged at four corners of the substrate layer 7Q.

When an image is captured by using the autofocus function, the balance between the Lorentz force and the elastic force of the plate spring 13X is adjusted between the imaging element and the PCB substrate 2X, whereby the distance between the imaging element and the PCB substrate 2X is controlled.

Specifically, current flowing in the actuator coils 17A is adjusted, whereby the Lorentz force acting between the magnets 26B and the actuator coils 17A is adjusted. Consequently, the imaging element is moved to a position according to the difference between the Lorentz force and the elastic force of the plate spring 13X and the Lorentz force and the elastic force are balanced. The position at which the Lorentz force and the elastic force are balanced is controlled in this manner, therefore, the distance between the substrate layer 7Q of the imaging element and the lens 34 is adjusted, for example, between 0.634 mm and 0.771 mm. In this manner, the position of the imaging element in the optical axis direction is controlled, whereby a moving-magnet type electric actuator is realized.

In the present embodiment, a plurality of the magnets 26B and a plurality of the actuator coils 17A are mounted on the surfaces orthogonal to the optical axis, respectively. Each pair of the magnet 26B and the actuator coil 17A is individually controlled, whereby tilting of the imaging element can be controlled.

The number of each type of coil and the magnets 26B arranged on the substrate layer 7Q may be any number. For example, three or less or five or more magnets 26B may be arranged on the substrate layer 7Q. Moreover, the arrangement and the number of the coils and the circuits arranged on the substrate layer 7Q are not limited to those shown in FIG. 6 and any number of the coils and the circuits may be arranged at any position. Moreover, the magnets 26B and the actuator coils 17B may be mixed on the substrate layer 7Q.

In this manner, according to the third embodiment, because the position of the imaging element is controlled by using the magnets 26B and the actuator coils 17A, the power consumption of the entire module can be suppressed while suppressing an increase in weight of the imaging element.

Fourth Embodiment

Next, the fourth embodiment of the present invention will be explained with reference to FIG. 7 and FIG. 8. In the fourth embodiment, a coil group is formed on a PCB substrate.

Figure 7:
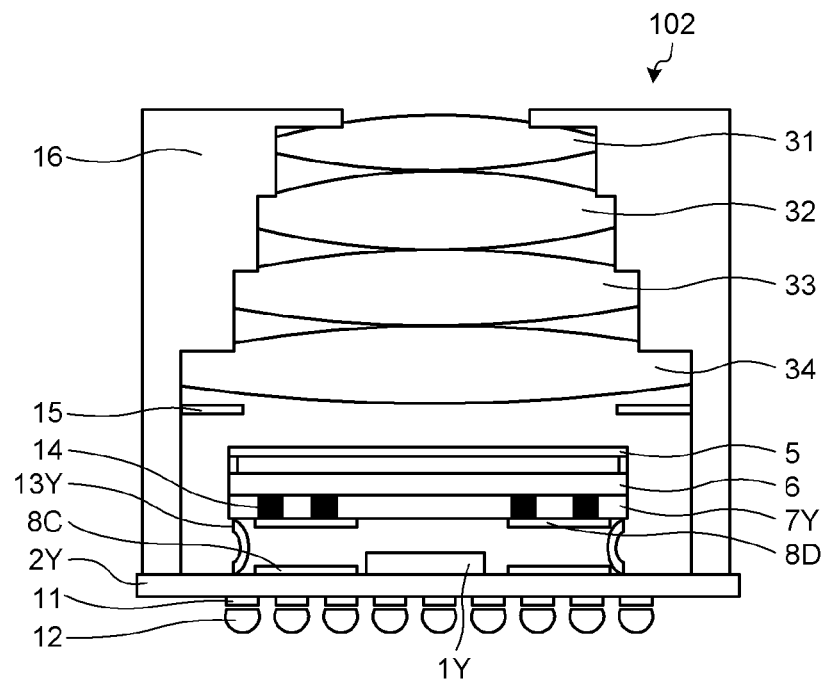
FIG. 7 is a diagram illustrating a cross-sectional configuration of an imaging device according to a fourth embodiment.

FIG. 7 is a diagram illustrating a cross-sectional configuration of an imaging device according to the fourth embodiment. FIG. 7 illustrates a cross-sectional view of an imaging device 102 cut along a plane parallel to the optical axis direction. Among the components in FIG. 7, components that achieve the same function as those of the imaging device 101 in FIG. 2 are denoted by the same reference numerals and overlapping explanation is omitted.

The imaging device 102 includes the lenses 31 to 34, the support 16, an imaging element, a PCB substrate 2Y, a plate spring 13Y, and the stopper 15. The PCB substrate 2Y includes a coil group 8C, a substrate chip 1Y, the solder pads 11, and the solder balls 12. The coil group 8C and the substrate chip 1Y are formed on the PCB substrate 2Y in the present embodiment. Moreover, the plate spring 13Y in the present embodiment connects a substrate layer 7Y of the imaging element to the PCB substrate 2Y.

The coil group 8C has a function similar to the coil group 8A. The data transmission coils 19A, the data reception coils 20A, the power coil 21A, and the actuator coils 17A are arranged on the PCB substrate 2Y as the coil group 8C. The coil group 8C is formed on the PCB substrate 2Y, for example, by a semiconductor process.

The imaging element in the present embodiment includes the infrared cut filter 5, the photodetector layer 6, the substrate layer 7Y, and a coil group 8D. The substrate layer 7Y has a function similar to the substrate layer 7X and the arrangement positions of the coils and the circuits on the substrate layer 7Y are different from those on the substrate layer 7X.

The coil group 8D has a function similar to the coil group 8B. The data transmission coils 19B, the data reception coils 20B, the power coil 21B, and the actuator coils 17B are arranged on the substrate layer 7Y as the coil group 8D. The coil group 8D is formed on the substrate layer 7Y, for example, by a semiconductor process.

Figure 8:
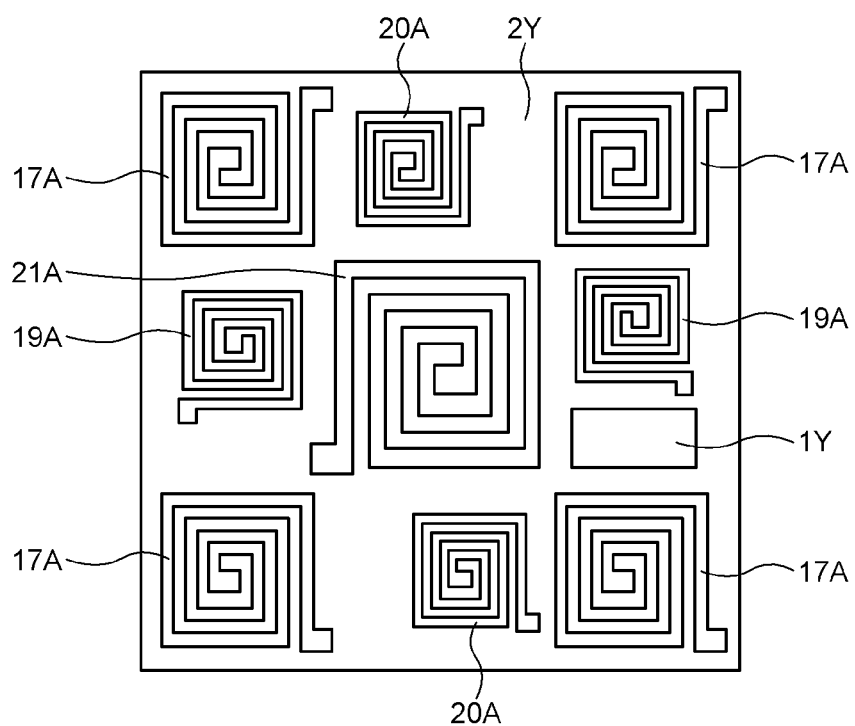
FIG. 8 is a top view of a PCB substrate according to the fourth embodiment.

FIG. 8 is a top view of the PCB substrate according to the fourth embodiment. FIG. 8 illustrates a diagram when the PCB substrate 2Y is viewed from the object side. Among the components in FIG. 8, components that achieve the same function as those in the PCB substrate 2X in FIG. 3 are denoted by the same reference numerals and overlapping explanation is omitted.

As shown in FIG. 8, the data transmission coils 19A, the data reception coils 20A, the power coil 21A, the actuator coils 17A, and the substrate chip 1Y are formed on the main surface of the PCB substrate 2Y on the object side. Then, the data transmission modulation circuit 18A, the data reception demodulation circuit 22A, the power modulation circuit 23, and the actuator coil drive circuit 24A are formed in the substrate chip 1Y (not shown in FIG. 8).

In the imaging device 102, the PCB substrate 2Y and the substrate layer 7Y of the imaging element are arranged to face each other. An example of the positional relationship between the coil group 8C arranged on the PCB substrate 2Y and the coil group 8D arranged on the substrate layer 7Y will be explained. In a similar manner to the imaging device 101, in the imaging device 102, the data reception coils 20A and 20B and the data transmission coils 19A and 19B are arranged such that the data transmission coils 19A face the data reception coils 20B and the data reception coils 20A face the data transmission coils 19B. Moreover, the actuator coils 17A and the actuator coils 17B are arranged to face each other. The arrangement and the number of the coils and the circuits arranged on the PCB substrate 2Y are not limited to those shown in FIG. 8 and any number of the coils and the circuits may be arranged at any position.

The wiring layer of the PCB substrate 2Y is thicker than the wiring layer of the substrate chip 1Y. Therefore, large current can be caused to flow in each coil in the coil group 8C compared with each coil in the coil group 8A.

In this manner, according to the fourth embodiment, because the coil group 8C is formed on the PCB substrate 2Y, power that can flow in the coil group 8C can be increased. Therefore, the power transfer efficiency is improved and the actuator drive performance is improved, thus, the chip size of the substrate chip 1Y can be further reduced.

Fifth Embodiment

Next, the fifth embodiment of the present invention will be explained with reference to FIG. 9 and FIG. 10. In the fifth embodiment, coils wound in opposite directions to each other are applied to a coil group on a substrate chip and a substrate layer. In the following, an imaging device including a substrate chip and a substrate layer according to the fifth embodiment is explained as the imaging device 102 (not shown).

Figure 9:
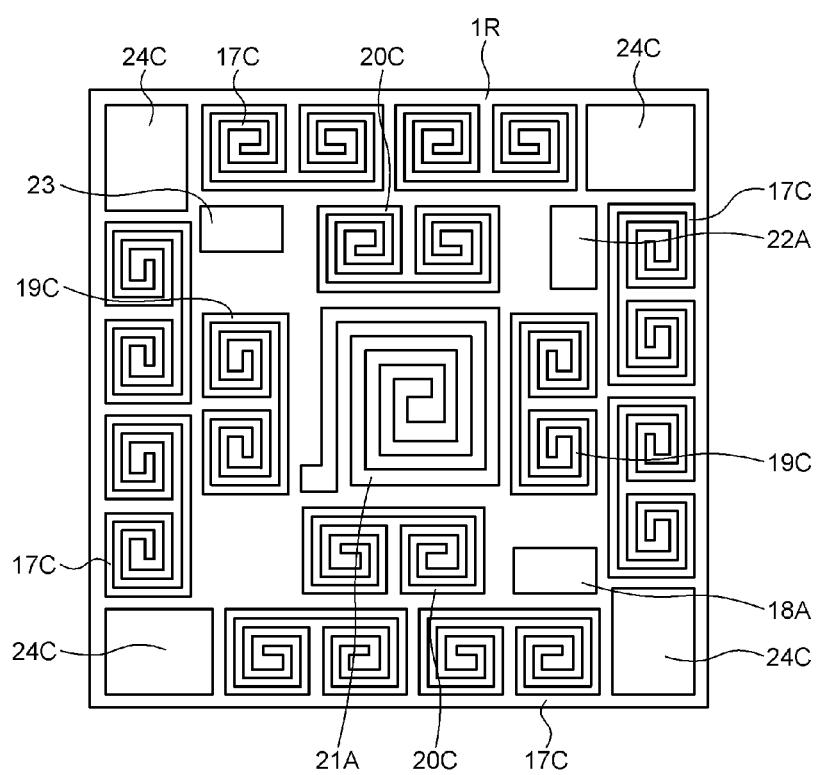
FIG. 9 is a top view of a substrate chip according to a fifth embodiment included in a PCB substrate.
Figure 10:
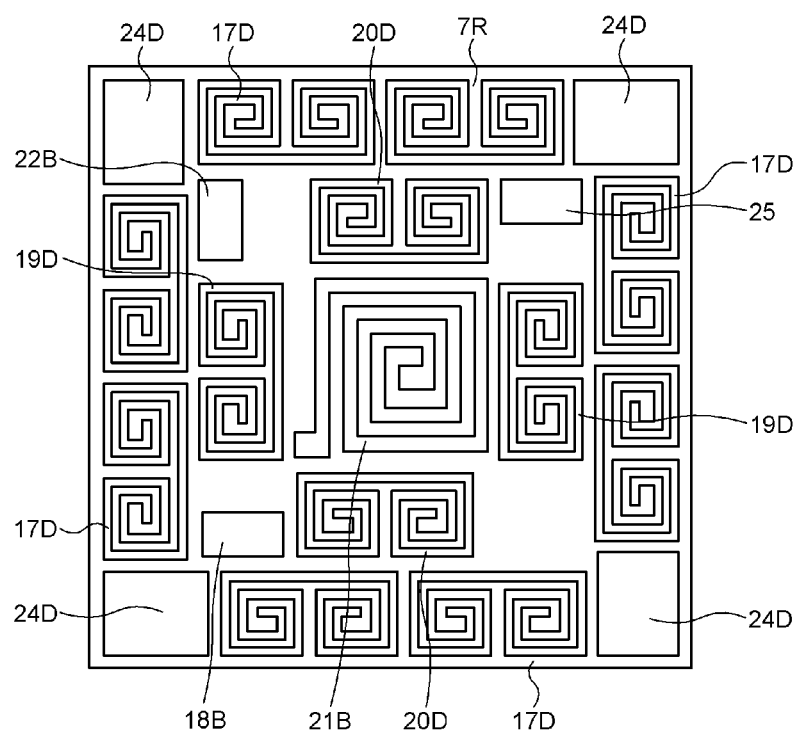
FIG. 10 is a top view of a substrate layer according to the fifth embodiment included in an imaging element.

FIG. 9 is a top view of the substrate chip according to the fifth embodiment included in the PCB substrate and FIG. 10 is a top view of the substrate layer according to the fifth embodiment included in the imaging element. Among the components in FIG. 9 and FIG. 10, components that achieve the same function as those in the substrate chip 1P and the substrate layer 7P in the first embodiment shown in FIG. 3 and FIG. 4 are denoted by the same reference numerals and overlapping explanation is omitted.

FIG. 9 illustrates a top surface of a substrate chip 1R, which is an example of the substrate chip 1X, as a diagram when the PCB substrate 2X is viewed from the object side. Moreover, FIG. 10 illustrates a bottom surface of a substrate layer 7R, which is an example of the substrate layer 7X, as a diagram when the imaging element is viewed from the image plane side. In the imaging device 102, the substrate chip 1R in FIG. 9 and the substrate layer 7R in FIG. 10 are arranged to face each other.

Data transmission coils 19C, data reception coils 20C, the power coil 21A, actuator coils 17C, the data transmission modulation circuit 18A, the data reception demodulation circuit 22A, the power modulation circuit 23, and actuator coil drive circuits 24C are formed on the main surface of the substrate chip 1R on the object side in the present embodiment. Each coil on the substrate chip 1R is formed, for example, by a semiconductor process.

In the present embodiment, the number of windings of the coil of the actuator coil 17C is made larger than the number of windings of the coil of the actuator coil 17A. Moreover, the number of windings of the coil of the data transmission coil 19C and the data reception coil 20C is made larger than the number of windings of the coil of the data transmission coil 19A and the data reception coil 20A.

The data transmission coil 19C is configured by connecting two coils whose winding directions are different. Moreover, the data reception coil 20C is configured by connecting two coils whose winding directions are different.

Moreover, the actuator coil 17C is configured by connecting four coils whose winding directions are different alternately. In the actuator coil 17C, four coils are connected by connecting two pairs of two coils, whose winding directions are different, with each other. The two pairs of coils configuring the actuator coil 17C are connected with each other on the back side of the substrate chip 1R or the like.

In the substrate chip 1R, two data transmission coils 19C are arranged to sandwich the power coil 21A in the top surface of the substrate chip 1R. Specifically, the two data transmission coils 19C are arranged to exhibit point symmetry with respect to the center of the substrate chip 1R being a symmetric point.

Moreover, in the substrate chip 1R, two data reception coils 20C are arranged to sandwich the power coil 21A in the top surface of the substrate chip 1R. Specifically, the two data reception coils 20C are arranged to exhibit point symmetry with respect to the center of the substrate chip 1R being a symmetric point.

Moreover, in the substrate chip 1R, four actuator coils 17C are arranged to exhibit 90-degree rotational symmetry with respect to the center of the substrate chip 1R being a symmetric point. For example, the four actuator coils 17C are arranged along the sides of the substrate chip 1R, respectively. Then, two data transmission coils 19C and two data reception coils 20C are arranged between the actuator coils 17C and the power coil 21A.

Moreover, in the substrate chip 1R, four actuator coil drive circuits 24C are arranged to exhibit 90-degree rotational symmetry with respect to the center of the substrate chip 1R being a symmetric point. For example, the four actuator coil drive circuits 24C are arranged at four corners of the substrate chip 1R.

As shown in FIG. 10, data transmission coils 19D, data reception coils 20D, the power coil 21B, actuator coils 17D, the data transmission modulation circuit 18B, the data reception demodulation circuit 22B, the power demodulation circuit 25, and actuator coil drive circuits 24D are formed on the main surface of the substrate layer 7R on the image plane side. Each coil on the substrate layer 7R is formed, for example, by a semiconductor process.

The actuator coil 17D has a configuration similar to that of the actuator coil 17C. Moreover, the data transmission coil 19D and the data reception coil 20D have a configuration similar to the data transmission coil 19C and the data reception coil 20C, respectively.

An example of the positional relationship between the coil group 8C arranged in the substrate chip 1R and the coil group 8D arranged in the substrate layer 7R will be explained. The data transmission coils 19C and the data reception coils 20D are arranged to face each other. Moreover, the data reception coils 20C and the data transmission coils 19D are arranged to face each other. Moreover, the actuator coils 17C and the actuator coils 17D are arranged to face each other.

The arrangement and the number of the coils and the circuits arranged on the substrate chip 1R are not limited to those shown in FIG. 9 and any number of the coils and the circuits may be arranged at any position. Moreover, the arrangement and the number of the coils and the circuits arranged on the substrate layer 7R are not limited to those shown in FIG. 10 and any number of the coils and the circuits may be arranged at any position.

In the substrate chip 1R, because coils wound in opposite directions to each other are combined as in the actuator coil 17C, the data transmission coil 19C, and the data reception coil 20C, flux leakage to the outside of a coil can be prevented and, as a result, interference to other coils can be mitigated.

In a similar manner, in the substrate layer 7R, because coils wound in opposite directions to each other are combined as in the actuator coil 17D, the data transmission coil 19D, and the data reception coil 20D, flux leakage to the outside of a coil can be prevented and, as a result, interference to other coils can be mitigated.

In this manner, according to the fifth embodiment, because coils wound in opposite directions to each other are combined in the substrate chip 1R and the substrate layer 7R, flux leakage to the outside of a coil can be prevented. Therefore, interference to other coils can be mitigated and an electrical signal and power can be efficiently transmitted.

The first to fifth embodiments may be combined. For example, the component in which the magnets are formed on the PCB substrate is applied to the imaging device by combining the second embodiment and the fourth embodiment. In this case, the magnets 26A and the substrate chip 1Y are formed on the PCB substrate. Then, the substrate layer 7P is applied to the imaging element. In this manner, according to the first to fifth embodiments, the positional relationship between the imaging element and the lens support can be changed with a small device configuration.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An imaging device comprising:
a lens support fixes a set of optical lenses;
a substrate fixes the lens support;
an imaging element is arranged to face the substrate between the set of optical lenses and the substrate; and
an elastic body whose one end portion is connected to the imaging element and whose another end portion is connected to a member other than the imaging element, wherein
the substrate includes a first Lorentz-force generating unit that generates a Lorentz force between the first Lorentz-force generating unit and the imaging element, the imaging element includes a second Lorentz-force generating unit that generates the Lorentz force between the second Lorentz-force generating unit and the substrate, and when an optical property of the imaging element with respect to the set of optical lenses is changed to a desired property, the substrate moves a position of the imaging element with respect to the set of optical lenses to a position according to the desired property and adjusts the Lorentz force to balance the Lorentz force with an elastic force of the elastic body at the position.

2. The imaging device according to claim 1, wherein
the first Lorentz-force generating unit includes a first actuator coil, and
the second Lorentz-force generating unit includes a second actuator coil or a magnet.

3. The imaging device according to claim 1, wherein
the first Lorentz-force generating unit includes a first actuator coil or a magnet, and
the second Lorentz-force generating unit includes a second actuator coil.

4. The imaging device according to claim 1, wherein
the substrate includes a first power coil that transfers power between the first power coil and the imaging element by electromagnetic induction,
the imaging element includes a second power coil that transfers power between the second power coil and the substrate by electromagnetic induction, and
the first power coil and the second power coil are arranged to face each other.

5. The imaging device according to claim 1, wherein
the substrate includes a first data transmission coil that transmits data to the imaging element by electromagnetic induction,
the imaging element includes a first data reception coil that receives data from the substrate by electromagnetic induction, and
the first data transmission coil and the first data reception coil are arranged to face each other.

6. The imaging device according to claim 1, wherein
the imaging element includes a second data transmission coil that transmits data to the substrate by electromagnetic induction,
the substrate includes a second data reception coil that receives data from the imaging element by electromagnetic induction, and
the second data transmission coil and the second data reception coil are arranged to face each other.

7. The imaging device according to claim 1, wherein an image is focused on the imaging element by the imaging element moving parallel to an optical axis between the set of optical lenses and the substrate.

8. The imaging device according to claim 1, wherein
a plurality of pairs of the first and second Lorentz-force generating units is included, and
the imaging element is tilted with respect to the set of optical lenses by adjusting a magnitude of the Lorentz force for each of the pairs of the first and second Lorentz-force generating units.

9. The imaging device according to claim 4, wherein
the substrate includes a power modulation circuit that modulates the power from a direct current to an alternating current and transmits the power to the first power coil, and the imaging element includes a power demodulation circuit that demodulates the power transferred to the second power coil from an alternating current to a direct current.

10. The imaging device according to claim 1, wherein the substrate rapidly shifts a position of the imaging element in an optical axis direction by rapidly changing the Lorentz force after moving the imaging element to a position at which an elastic force of the elastic body is maximized.

11. An electronic apparatus comprising:
an imaging device, wherein
the imaging device includes
a lens support fixes a set of optical lenses,
a substrate fixes the lens support,
an imaging element is arranged to face the substrate between the set of optical lenses and the substrate, and
an elastic body whose one end portion is connected to the imaging element and whose another end portion is connected to a member other than the imaging element,
the substrate includes a first Lorentz-force generating unit that generates a Lorentz force between the first Lorentz-force generating unit and the imaging element,
the imaging element includes a second Lorentz-force generating unit that generates the Lorentz force between the second Lorentz-force generating unit and the substrate, and
when an optical property of the imaging element with respect to the set of optical lenses is changed to a desired property, the substrate moves a position of the imaging element with respect to the set of optical lenses to a position according to the desired property and adjusts the Lorentz force to balance the Lorentz force with an elastic force of the elastic body at the position.

12. The electronic apparatus according to claim 11, wherein
the first Lorentz-force generating unit includes a first actuator coil, and
the second Lorentz-force generating unit includes a second actuator coil or a magnet.

13. The electronic apparatus according to claim 11, wherein
the first Lorentz-force generating unit includes a first actuator coil or a magnet, and
the second Lorentz-force generating unit includes a second actuator coil.

14. The electronic apparatus according to claim 11, wherein
the substrate includes a first power coil that transfers power between the first power coil and the imaging element by electromagnetic induction,
the imaging element includes a second power coil that transfers power between the second power coil and the substrate by electromagnetic induction, and
the first power coil and the second power coil are arranged to face each other.

15. The electronic apparatus according to claim 11, wherein
the substrate includes a first data transmission coil that transmits data to the imaging element by electromagnetic induction,
the imaging element includes a first data reception coil that receives data from the substrate by electromagnetic induction, and
the first data transmission coil and the first data reception coil are arranged to face each other.

16. The electronic apparatus according to claim 11, wherein
    the imaging element includes a second data transmission coil that transmits data to the substrate by electromagnetic induction,
    the substrate includes a second data reception coil that receives data from the imaging element by electromagnetic induction, and
    the second data transmission coil and the second data reception coil are arranged to face each other.

17. The electronic apparatus according to claim 11, wherein an image is focused on the imaging element by the imaging element moving parallel to an optical axis between the optical lenses and the substrate.

18. The electronic apparatus according to claim 11, wherein
    a plurality of pairs of the first and second Lorentz-force generating units is included, and
    the imaging element is tilted with respect to the set of optical lenses by adjusting a magnitude of the Lorentz force for each of the pairs of the first and second Lorentz-force generating units.

19. The electronic apparatus according to claim 14, wherein
    the substrate includes a power modulation circuit that modulates the power from a direct current to an alternating current and transmits the power to the first power coil, and
    the imaging element includes a power demodulation circuit that demodulates the power transferred to the second power coil from an alternating current to a direct current.

20. The electronic apparatus according to claim 11, wherein the substrate rapidly shifts a position of the imaging element in an optical axis direction by rapidly changing the Lorentz force after moving the imaging element to a position at which an elastic force of the elastic body is maximized.

* * * * *